United States Patent [19]

Schomberg

[11] Patent Number: 5,317,735

[45] Date of Patent: May 31, 1994

[54] SYSTEM FOR PARALLEL COMPUTATION WITH THREE PHASE PROCESSING IN PROCESSOR TIERS IN WHICH NEW INSTRUCTIONS TRIGGER EXECUTION AND FORWARDING

[75] Inventor: Hermann Schomberg, Hamburg, Fed. Rep. of Germany

[73] Assignee: U.S. Philips Corporation, New York, N.Y.

[21] Appl. No.: 715,193

[22] Filed: Jun. 14, 1991

[30] Foreign Application Priority Data

Jun. 14, 1990 [DE] Fed. Rep. of Germany ....... 4019040

[51] Int. Cl.⁵ .............................................. G06F 15/16
[52] U.S. Cl. ............................. 395/650; 364/DIG. 1; 364/229; 364/230.3; 364/284.3; 364/282.4; 364/283.2; 364/270.5; 364/270.7; 395/800; 395/325; 370/60
[58] Field of Search ............... 395/200, 650, 325, 800; 370/60

[56] References Cited

U.S. PATENT DOCUMENTS

| | | | |
|---|---|---|---|
| 3,614,745 | 10/1971 | Podvin et al. | 395/650 |
| 4,219,873 | 8/1980 | Kober et al. | 395/650 |
| 4,598,400 | 7/1986 | Hillis | 370/60 |
| 4,644,496 | 2/1987 | Andrews | 395/800 |
| 4,740,910 | 4/1988 | Sakata et al. | 395/325 |

Primary Examiner—Thomas C. Lee
Assistant Examiner—Wayne Amsbury
Attorney, Agent, or Firm—Anne E. Barschall

[57] ABSTRACT

Multicomputer systems frequently consist of a network of node computers connected to one another in a particular topology, and at least one host computer which controls the network. To execute a task, the host computer loads a program into the node computer, and this is then followed by data, either from the host computer or possibly from a peripheral device also connected to the network, which are processed in accordance with the loaded program. In order to then avoid during the execution of plurality of similar tasks in succession, as is the case during the processing of successive images for instance, that the network has to be loaded again in each case, the network program is designed in such a way that all node computers execute a cycle composed of three parts, wherein in the first part an instruction for starting a task is received from the host computer, in the second part execution is effected with exchange of data packets between node computers, and in the third part a ready message is collected from all node computers, following which all node computers await a new instruction from the host computer in order to execute the same or a similar task with new data. In addition, various methods of information transfer in the network of node computers are described.

11 Claims, 3 Drawing Sheets

SYSTEM FOR PARALLEL COMPUTATION WITH THREE PHASE PROCESSING IN PROCESSOR TIERS IN WHICH NEW INSTRUCTIONS TRIGGER EXECUTION AND FORWARDING

FIELD OF THE INVENTION

The invention relates to a multicomputer system comprising at least one host computer and one parallel computer consisting of a network of independent node computers connected to one another via separate bidirectional connection lines, at least one node computer being connected to the host computer, in which the individual node computers each contain at least one distributor and one work processor, and a work processor executes a corresponding program or part program as a result of an instruction generated by the host computer and only exchanges information with the distributor of the same node computer via an node internal bidirectional connection, and only the distributors exchange information with other distributors via the connection lines.

Multicomputer systems of this type are generally known and are used for fast and/or cost-efficient solving of data processing tasks by means of parallel processing. Examples are the processing of digital images or the solving of large sets of equations for simulating physical systems.

The basic idea of parallel processing is to distribute the problem over the node computers, whereupon all node computers solve their partial task simultaneously. If the partial tasks are smaller, the solution of the overall task is achieved more quickly than if it were solved by only one computer with the same speed. The partial tasks are generally not completely independent of one another, but rather it will be necessary to send data from one node computer to another. The bidirectional connection lines are provided for this purpose.

The host computer handles the connection to the external environment and supplies the programs with which the node computers solve their respective partial task and if necessary also data of the problem to be solved. To do this, it transfers information to the network, to be precise via the node computer(s) connected to it, which send this information onwards within the network if necessary. Once all node computers have solved their partial task, the host computer can then receive the results likewise via the node computers directly connected to it. However, it is also possible to connect peripheral devices to preferably other node computers of the network to supply the data to be processed and to output the results.

In general it is assumed that after a problem has been solved by the overall network, to solve a further problem, the host computer then transfers the corresponding programs to the node computers as a result of which the execution of the partial tasks of the individual node computers is started essentially immediately.

However, it is frequently the case that several problems of the same type are to be solved in succession with different data. In this case, after each individual problem solving, in practice the same program would be loaded again into the node computers and started. Especially in the case of problems with fast-executable partial tasks, this requires a considerable amount of time which is lost for the actual problem solving. A typical example of a series of similar or related problems is the processing of a plurality of successive images in the same or a related manner.

SUMMARY OF THE INVENTION

The object of the invention is to provide a multicomputer system of the type mentioned above with which a plurality of successive related problems can be processed shorter time.

According to the invention, this object is achieved in that, for each instruction from the host computer, each node computer executes a repeating cycle composed of three parts, in the first part of which, as the instruction part, the distributor forwards an instruction received from the host computer via an arbitrary connection line essentially to all distributors connected directly to it and to the work processor of the same node computer, wherein, if the same instruction is received repeatedly, a distributor does not forward the instruction received following the first reception, in the second part of which, as the execution part, the work processor starts the execution of the program corresponding to the instruction received from the distributor and at the same time the distributor independently executes the forwarding of a data packet received from the work processor of the same node computer or via external connection lines on the basis of transport control information, and in the third part of which, as the ready signalling part, each distributor outputs a ready message via a predetermined connection line when the work processor in the same node computer and the distributor(s) in the node computer(s) in the predetermined neighbourhood have output a ready message, so that the node computer connected to the host computer only outputs a ready message to the host computer when its work processor and the work processors of all other node computers have output a ready message.

In this way the network need be loaded only once with the programs for the individual node computers and these then require only one new instruction of the host computer in each case to execute a processing problem again. For this, the host computer sends the instruction to the node computer(s) directly connected to it, if necessary with parameters in order to modify the individual programs by the parameters transferred with the instruction or else to select one from a plurality of programs or part programs in each node computer. It is clear that there must be a way of allowing a renewed loading of the programs of the individual node computers by the host computer to solve a problem of a different type. The forwarding by the distributor of each node computer of a received instruction via all external connection lines to all directly connected node computers ensures that, given a node computer located further away from the node computer connected to the host computer, no data packet can arrive from a preceding node computer which received the instruction earlier, since the instruction is forwarded through the network in the fastest possible manner, it being assumed here that information sent successively via the same connection line always retains the same order. This prerequisite is, however, normally fulfilled, especially if no buffer memories for more than one item of parallel information are provided in the transfer route.

The repeating cycle of instruction-execution-ready message need be programmed only once in such a way that all participating programs of the node computer execute in a cooperative manner a global "continuous loop", which consists of an "instruction-executionready message" cycle can be repeated as often as desired. It may even be sensible to design large parts of this repeating cycle independently of the actual problem; only the part which an instruction at the node computer executes, typically a part program, is problem-dependent, the rest is a problem-independent frame program. This cyclical procedure is, moreover, independent of the respective topology of the connections of the node computers to one another in the network.

The problems hardly ever follow in direct succession, but there are more or less long periods in between in which the node computers must wait for a new instruction. According to an embodiment of the invention, such a waiting state can be achieved simply in that, before the reception of an instruction, all distributors are in a passive state in which they are in a program loop solely for receiving an instruction. As a result of the program loop, it is achieved in a simple way that the time interval between a ready message and a subsequent instruction may be of any desired length.

To avoid in a reliable manner that a node computer, particularly when it is located further away from the connection of the host computer, already receives data packets or requests for data packets from a node computer which received the instruction before it itself has received an instruction, a further embodiment of the invention is characterized in that each distributor first of all sends a received instruction onward via the corresponding connection lines and only then passes it to the work processor of the same node computer.

As mentioned supra, in general data packets are exchanged between node computers during the execution of an instruction, that is to say during the processing of a problem. This takes place via the information paths present between all node computers, some of which extend via intermediate node computers or their distributors. With many known connection architectures, each distributor of the node computer also has a plurality of connections, so that between many node computer pairs, a plurality of information paths exist via various other node computers which paths may have the same or a different length, as determined by the number of transfer steps required from the sending node computer to the destination node computer. If, therefore, the distributor of a node computer receives a data packet, either via an external connection line from another node computer or via the internal connection line from its own work processor, it must be decided in the simplest possible way via which connection line this data block intended for another node computer is to be sent. A simple embodiment of the invention for this purpose is characterised in that each data packet to be transferred during the execution of an instruction contains at the beginning a destination specification of where the data packet is to be transferred, and in that on the basis of this destination information each distributor determines in accordance with a local method the connection line via which the respective data packet is to be forwarded. It is therefore not necessary for each data packet to carry the entire route information. A destination may be another node computer the host computer, or a peripheral device.

A local method may be an algorithm which determines the outgoing connection line from the destination specification and the number or address of the local node computer, taking account of the connection topology of the network. According to a further embodiment of the invention, a particularly simple method is that the local method consists in accessing an individual connection list stored in each distributor, which list contains for each destination specification at least one connection specification of the connection line via which the respective data packet is to be forwarded. Such an access can be executed particularly speedily without computation.

A data packet should be forwarded as quickly as possible. A further embodiment of the invention is therefore characterised in that, with each forwarding of a data packet in accordance with the connection list, the distance to the destination indicated by the destination specification decreases. Although certain delays can occur due to two data packets to be forwarded simultaneously via the same connection line, which is then only possible in succession, with the specified destination-orientated forwarding, however, the structure of the connection list is far simpler than if blocking possibilities were also taken into account. Moreover, this would require a certain computing effort for the forwarding decision, which for the latter could possibly mean a time delay.

If, however, the traffic load of individual connection lines is to be taken into account, a further embodiment of the invention is characterised in that a plurality of connection specifications are stored in the connection list for at least some of the destination specifications, and the selection among the connection specifications for a destination specification is carried out in accordance with a predetermined scheme. Between many nodes there are plurality of information paths via various different nodes which may require, the transfer from a particular node computer via various connection lines and this can be taken account of as a plurality of connection specifications in the connection list. It is then only necessary to make a selection from these plural specifications, which can be done quickly. A selection scheme consists, for example, of a cyclically successive addressing of the specifications for each following data packet for the same destination, or of a random selection. It is also possible to take account of the traffic load.

In the case of extensive networks with a large number of node computers, however, a relatively long list results in each distributor. Such large numbers of node computers are, preferably arranged as a multidimensional arrangement with respect to the connection lines for an effective connection structure. In this case, the length of the connection list in each distributor can be reduced in that, given multidimensional arrangement of the node computers with respect to the connection lines, the destination specification consists of in each case one part-destination specification for each dimension, and in that each connection list has in each case one section for each dimension which contains a connection specification for the respective dimension. Given a two-dimensional arrangement in rows and columns, for example, the list in each distributor has two sections for the connections in vertical and horizontal direction in each case. In particular when the node computers are arranged in only a simple regular array with respect to their connection lines, the order of the dimensions during the forwarding may be largely arbitrary, i.e. transfer steps may alternate between horizontal and vertical in the next node. With a more complex connection structure, according to a further embodiment of the invention it may be more expedient if the distributors forward a data packet in the same dimension for all distributors until it has reached the destination ordinate in this dimension, and then forward it accordingly in the further dimensions. In this way a path to the destination is reliably found, which, however, need not necessarily be the shortest path.

The ready message must be forwarded in such a way that the node computer connected to the host computer automatically receives, regardless of the chronological order in which the individual node computers output their ready message, a ready message from all predetermined neighbours only after all these preceding node computers have output such a ready message. According to a further embodiment of the invention, it is expedient for this purpose if each distributor forwards a ready message via a connection line to a node computer which is closer to the host computer. In this way, a node computer only forwards a ready message once all node computers located further away have output a ready message. If a ring connection is present, it is also possible to use the reverse direction, i.e. the same direction in which the instruction was distributed over the network, since the ready messages can also be expected in this direction and they can finally be passed quickly via the ring connection to the node computer connected to the host computer.

Given a large number of node computers, the forwarding of the ready message may take a considerable amount of time. According to a further embodiment of the invention, it is expedient here if, given multidimensional arrangement of the node computers with respect to the connection lines, each distributor forwards a ready message in the direction of a dimension that is the same for all distributors when the preceding distributor in this dimension and its own work processor have output a ready message, until this message reaches the first node computer, which also includes the or a node computer connected to the host computer, in this dimension, and in that the distributors in these node computers perform the forwarding of the ready message in a corresponding manner in another dimension in each case. In this way, during the collection of the ready messages, in each case one dimension after the other is virtually completely processed, until finally only the node computer connected to the host computer receives at last the ready messages of its predetermined neighbors and can pass them on to the host computer.

BRIEF DESCRIPTION OF THE DRAWINGS

Exemplary embodiments of the invention are described in greater detail below with reference to the drawing, in which.

DESCRIPTION OF PREFERRED EMBODIMENTS

Figure 1A:
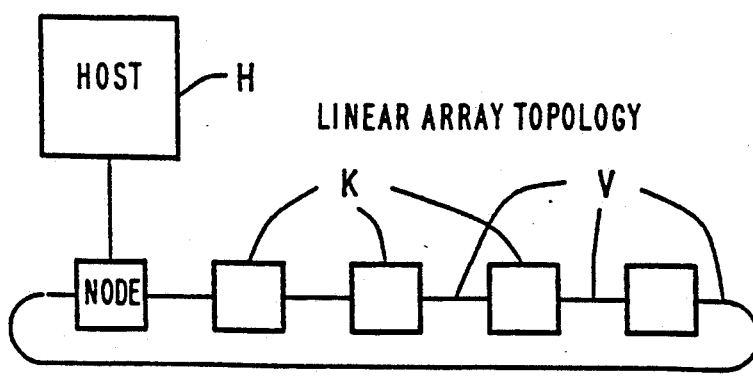
FIG. 1a to 1c show parallel computers each comprising a plurality of node computers with different connection topologies.
Figure 1B:
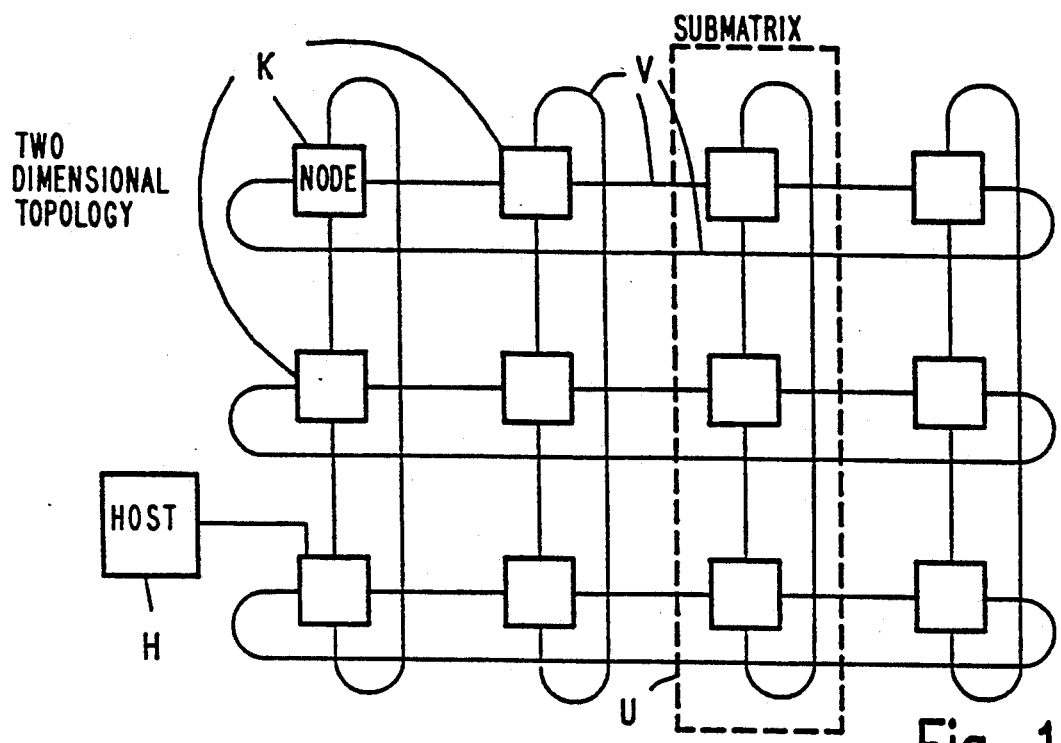

There are various ways, some of which are particularly advantageous for particular problems, for interconnecting a network of independent connecting node computers within a parallel computer network. Represented in FIG. 1a for example, is a linear arrangement of node computers K, of which in each case two neighboring node computers are connected to one another via bidirectional connection lines V. The first node and the last node are also connected to one another, so that the connection lines V with the node computers K form a closed ring. A host computer H is connected to the node computer on the far left-hand side.

Where a larger number of node computers is used, a multidimensional structure of the connections is expedient, such as the two-dimensional topology of FIG. 1b. Here the node computers K are arranged in a matrix, and the connections V in each case connect two node computers in horizontal and vertical direction. A host computer H is again connected to the node at the bottom left-hand side. In this case, the node computers located in a row in horizontal direction in each case or the node computers located in a column in vertical direction with respect to one another are considered in each case to be one submatrix with respect to the corresponding connections, such as, for example, the submatrix U in FIG. 1b. This connection topology can also be extended to three or more dimensions, in which case correspondingly more connections exist between respective neighbouring node computers. In an actual multicomputer system, the node computers may have a different spatial arrangement with respect to one another; the dimensions mentioned relate only to the connection topology.

Figure 1C:
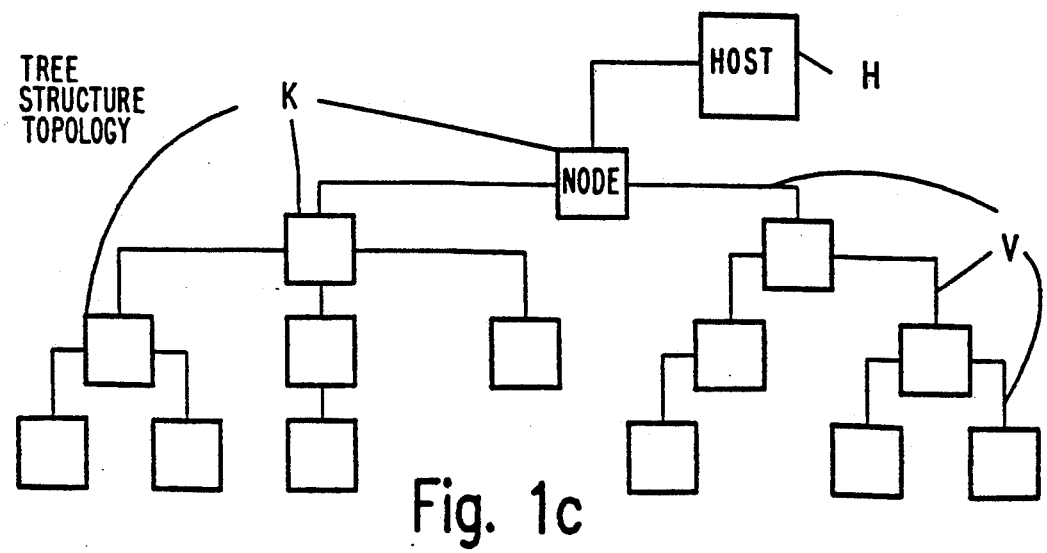

A tree structure, is represented in FIG. 1c. The topmost node K, which again is connected to the host computer H, represents the root of the tree which is connected via the connection lines V to the other node computers K, which can be viewed here with respect to a plurality of connections as though arranged in a plurality of levels. With this topology, all nodes except for the node computer forming the root have exactly one father and all node computers except for the ones located in the lowermost level have one or more sons.

Figure 2:
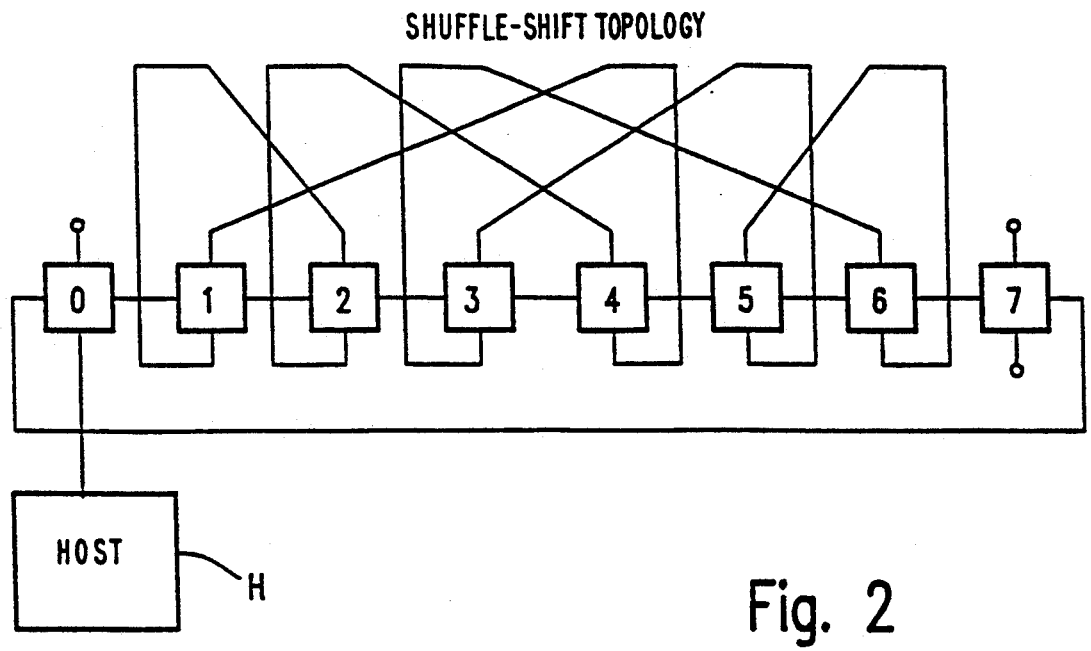
FIG. 2 shows a one-dimensional arrangement of node computers with respect to the connections having a plurality of interconnections.

In all connection topologies described above, further connections between the node computers are also possible. A one-dimensional connection topology with a plurality of connection lines between the individual node computers is shown in FIG. 2. This represents the known perfect shuffle-shift topology. Each of the eight node computers, which are numbered here from 0 to 7, has four connections. For example, the node computer 3 is connected via the lateral connections to its two neighbours 2 and 4, and furthermore this node is connected via the top and bottom connections to the nodes 5 and 6. As a result, for the transfer of information from the node computer 1 to the node computer 5, for example, only two steps are necessary, namely in the first step a data packet can be transferred from the node computer 1 to the node computer 4 via the top connection line, and in the next step the data packet is transferred from the node computer 4 to the node computer 5 via the lateral shift connection line. With this connection topology, two of the four connections remain free at both ends of the node computers, to which the host computer H or further peripheral devices (not illustrated) can advantageously be connected.

It should be noted that, for example, the matrix connection topology represented in FIG. 1b can also be considered to be a one-dimensional topology, in that the nodes are simply numbered sequentially, as a result of which additional connections are likewise present between non-neighbouring node computers.

In the arrangements of node computers represented in FIG. 1 and FIG. 2, these are loaded with a program by the host computer, to be precise via the node computer that is directly connected to the host which then forwards the respective information to the other node computers. The individual node computers may be constructed in each case of a so-called transputer, or may contain one or more such transputers, and the operation of such transputers, for example also the loading of a program, is known from the corresponding specification sheets of the manufacturer INMOS Corporation. After the programs have been loaded, the data to be processed is fed to the node computers, either by the host computer or by peripheral devices (not illustrated) which may be connected to the same node computer as the host computer or to one or more arbitrary other node computers.

Figure 3:
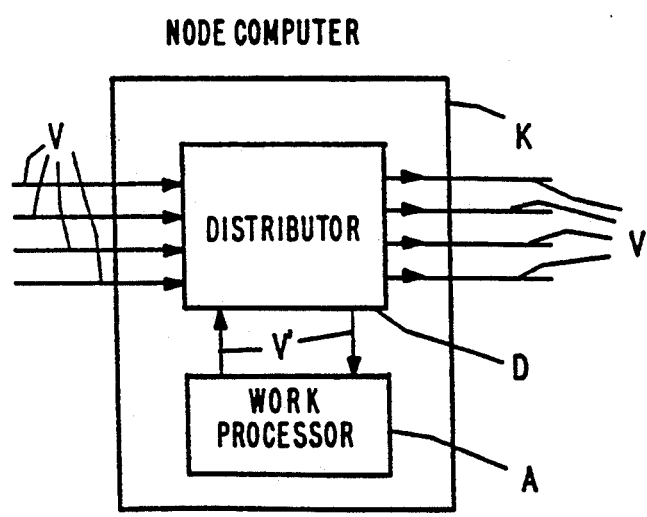
FIG. 3 diagrammatically shows the internal structure of a node computer.

For a more detailed description of the processing sequence, first of all the general structure of a node computer will be explained in greater detail with reference to FIG. 3. Leading into the node computer K are here four connection lines, via which the information can be transferred in a bit-serial manner or also word-by-word in a bit-parallel manner, for which purpose the individual connection lines then actually consist of the corresponding number of wires. Correspondingly, four connection lines V also lead out of the node computer K. In each case one ingoing and one outgoing connection line belong together here and form a bidirectional connection line.

In the node computer K, the connection lines V lead to a distributor D, which is also connected to a so-called work processor A via internal connection lines V', which likewise form a bidirectional connection. Said work processor A executes the actual programs for processing data, while the distributor D manages only the transfer of information, particularly the data packets. In this arrangement, each ingoing connection line V and also V', can be connected to an outgoing connection line V or also V'. The distributor D and the work processor A may be separate processors, but it is also possible for only one processor to be provided for this, which with corresponding control handles the function of both parts. If appropriate, the node computer K can also contain further processors (not illustrated) or other elements. If the distributor D and the work processor A are realised with a single processor, the connection V' between the two parts D and A is not physically present, but is realised by the control.

The distributor D thus serves to forward information, such as data packets for example, arriving via the connections V or V', to an outgoing connection V or V'. It may be the case that information is present simultaneously at a plurality of ingoing connection lines. These are then forwarded in succession.

Each distributor receives via its ingoing connection lines only three types of information, which serve different purposes and are therefore treated differently. These are:
  Instruction,
  Data packet,
  Ready message.

It is expedient if the first byte of each information item specifies whether the rest of the information is an instruction, a data packet or a ready message.

Each of these information types occurs in each case in one of three parts of a cycle which is executed in the network by each node computer for each processing task. For this purpose, once the network program has been loaded by the host computer, all distributors and all work processors enter a continuous loop of the program. This marks the beginning of the cycle, in which all node computers await an instruction.

Figure 4:
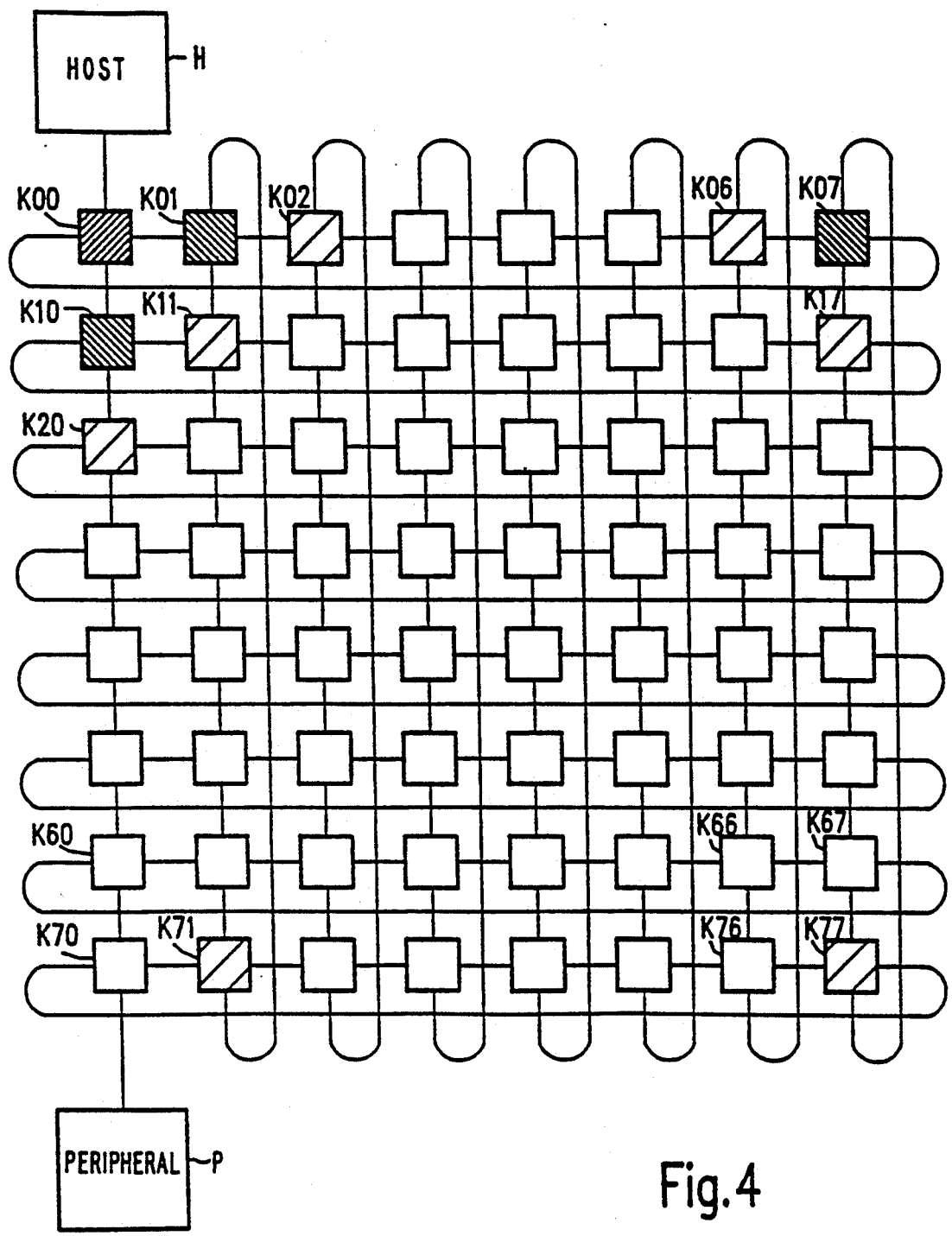
FIG. 4 shows a simple intermeshed network of eight×eight node computers.

The host computer then sends, in addition to possible parameters, an instruction to the node computer directly connected to it. In FIG. 4, this is the node K00, which is directly connected to the host computer H.

At the beginning of a cycle each distributor is "passive" and waits for an instruction. If, then, a distributor is passive and receives an instruction from an external connection line, it switches to the "active" state. In FIG. 4 this is thus only the node K00 in the first step. In the first step, this then transfers the instruction via all outgoing external connection lines, so that the nodes K01, K07 are then switched to the active stage via the ring connection and K10. In the second step, these nodes then transfer the instruction via all external connection lines going out from these nodes, so that the nodes K02, K11, K20, K06, K17 and also the nodes K71 and K77 are then switched to the active state via the ring connections of the nodes K01 and K07. This is illustrated in FIG. 4 by the different hatchings of these nodes. In the course of forwarding, it is moreover possible to ensure that the instruction is not sent to the node from which it was received immediately previously. For example, in the second step the instruction does not need to be sent by the nodes K01, K08 and K10 back to the node K00. However, with this type of instruction forwarding, it is not possible to avoid an instruction reaching a node which is already active, as is the case with the node K17, which receives an instruction both from the node K07 and from the node K10 via the ring connection. Although in this case these arrive simultaneously, they are processed in succession, as already mentioned. Only the first processed instruction then switches the distributor to the active state and is processed normally, i.e. forwarded, whereas an instruction reaching an already active distributor is only accepted i.e. acknowledge, so that the sender can remove this instruction again from the connection line, but it is otherwise ignored. However, it can be seen that the instruction reaches all other nodes from the node K00 as quickly as possible in this way. Depending on the connection topology in each case, different numbers of steps are necessary for this.

Once a distributor has sent the instruction to all the neighbouring nodes, last of all it sends it to the local work processor. Each work processor likewise executes a continuous loop, at the beginning of which it awaits an instruction from its distributor in each case. If it receives one, it executes it. The instruction and its parameters are typically used to start a subprogram (procedure, routine) of the work processor.

If a work processor then begins to execute an instruction, it will generally wish to send data to other work processors and conversely receive data from other work processors. Data can also be exchanged with the host computer or the peripherals, P. This takes place by transferring a data packet. A data packet consists of a plurality of fields, the first of which is expediently the destination address of the destination node. Since host computers and peripherals may also be destinations, they also have an address. The address is simply a defined number unambiguously identifying the addressee. With up to 256 possible destinations, one byte is sufficient for the address. Each node knows its own address.

Further fields of a data packet may contain optional parameters as well as necessarily the actual data to be transferred.

A data packet is passed on by the work processor to its distributor, and from then on the distributors handle the forwarding to the destination, where it is forwarded to the local work processor in the case of a node, and otherwise to the host computer or the peripheral device. As a result of the method explained for the forwarding of instructions and the prerequisite that one item of item of information on a particular path cannot be overtaken by a following item of information, it is guaranteed that a data packet from an already active node cannot arrive before an instruction at a still passive mode.

A method is now required for the destination-oriented forwarding of data packets. One possibility is to provide the data packet with all the route information. Each distributor can then use this information for forwarding. More favourable are local methods which use the destination address of the data packet and the address of the node at which it is currently located. There are local algorithms for some connection topologies, e.g. n-dimensional arrays or torus or hypercubes.

The method used here consists in storing the forwarding information in a local table. For clarification, a linear serial numbering of the nodes and the other destinations is assumed, which is always possible with a connection topology corresponding to an n-dimensional matrix. There are then a total of M possible destination addresses, m=0, . . . , M−1. Each distributor then contains a table of length M, the $M^{th}$ entry of which specifies where a packet is to be sent to next at this current mode if it is to reach destination number m. Each local step is expediently selected in such a way that the distance to the destination is always reduced by one step. It is achieved in this way that the packet is forwarded along a shortest path, since the distance is reduced by 1 for every step so that the package reliably arrives in the fastest possible way.

With known connection topology of the network, tables of this type can be derived directly therefrom and then stored permanently in the distributors. This applies to all connection topologies. Access to a table is moreover to be executed with very little time outlay. The tables of the distributors of all node computers of the network can be considered to be a matrix, and such a matrix for the network represented in FIG. 2 is given in the following table.

|  |  | Destination 0 1 2 3 4 5 6 7 |
|---|---|---|
| Current node | 0 | W,R,R,L,R,L,L,L,S,U,L,L |
|  | 1 | L,W,S,R,U,U,R,L,L,L,L |
|  | 2 | L,U,W,R,S,S,R,L,L,L,L |
|  | 3 | R,L,L,W,R,U,S,S,R,R,S,S |
|  | 4 | S,S,U,L,W,R,R,L,S,S,L,L |
|  | 5 | R,L,S,S,L,W,U,R,R,R,R,R |
|  | 6 | R,L,U,U,L,S,W,R,R,R,R,R |
|  | 7 | R,R,R,L,R,L,L,W,R,R,S,U |

In this, W denotes that the distributor feeds the received data packet to its own work processor, i.e. the data packet has reached the destination node. R denotes that a data packet is forwarded to the neighbour on the right, and L denotes forwarding to the neighbour on the left. S denotes the forwarding via the bottom output of each node in FIG. 2, and U denotes the forwarding via the top output. In the matrix the columns specify the destination address and the individual rows specify the respective node numbers. The four right-hand columns of the matrix specify the free outputs of the nodes 0 and 7 or the host computer H. If, therefore, a data packet is to be forwarded from the node 1 to the node 5, this data packet is output by the distributor of the node 1 via the top input, as is specified by the U in the row 1 and the column 5, and thus reaches the node 4. From the node 4 it is output at the right output as is specified in the row 4 and the column 5, and thus reaches the node 5. After row 5, column 5, the distributor located therein forwards the data packets to its own work processor, because this is the destination node. Together with the physically present connection lines, the matrix describes the connection topology of the network. In the case of different networks, it is then essentially necessary to change only this matrix, while the remaining connection procedure can remain virtually unchanged.

There are frequently several paths leading from a sending node to a destination node, and at least some of which also have the same length, as can be seen, for example, from the arrangement according to FIG. 4 if, for example, the sending node and destination node are located several nodes away from one another in diagonal direction, it being assumed that only the specified connections, but no diagonal connections, are present. Particularly in such a case, the tables in the distributors of the various nodes are constructed in such a way that, for the most frequent problems, all connection lines are loaded approximately equally. In this way it is at least possible to alleviate blockages. However, it is also possible for the table to contain, at least for some destination nodes, a plurality of entries per destination, one of which is selected according to a method taking account of the transfer load of the individual connection lines. It may expedient here if, as an exception, the distance to the destination node is not reduced one time during a forwarding if it is possible in this way to avoid a jam situation.

A reduction of the tables is achieved if the node computers are connected to one another in a multi-dimensional connection topology, such as, for example, the two-dimensional connections of the arrangement according to FIG. 4, in that each destination address is not serially numbered linearly, but rather the destination address is subdivided into a section for each dimension. If $N_k$ is the number of nodes in the $k^{th}$ dimension, instead of a table of length $N_1 \cdot N_2 \cdot \ldots N_n +$ number of the external destinations, n tables of length $N_k +$ number of the external destinations are stored per distributor. $N_1 + N_2 + \ldots N_n + p$ (p=number of external destinations) entries are less sufficient, which is generally far fewer than for the linear serial numbering. The $k^{th}$ table of a distributor in question thus contains the routing information for the one-dimensional subarray along the $K_{th}$ dimension belonging to the distributor in question. It simply describes, as in the one-dimensional case, the routing along this one-dimensional subarray. It is therefore also possible to determine it a priori. However, because its length is shorter, its determination is more practicable than the determination of a single table of the length for linear serial numbering.

Given the presence of n tables, the forwarding may be effected, for instance, as follows:

If $(i_1^z, i_2^z, \ldots, i_n^z)$ is the destination address and $(i_1^s, i_2^s, \ldots, i_n^s)$ is the start address, then first of all forwarding is carried out along the first dimension until the node ($i_1^z, i_2^s, \ldots, i_n^s$) is reached, then along the second dimension, etc. The order of dimensions may also be different.

With some topologies, e.g. a pure n-dimensional array or torus, it is not even necessary to perform all steps in one dimension in series, but rather it is also possible to select each time any dimension and execute a step in this direction.

Once a local work processor has then executed its instruction, it could then receive the next instruction, that is to say return to the beginning of its continuous loop again. However, it must first be established in a suitable manner that all work processors are ready, and that this is notified to the host computer via the nodes directly connected thereto. It is also necessary for the status of the ready node to be reset from "active" to "passive", so that the distributors of the nodes can also return to the beginning of their continuous loop. This is all achieved with the "ready message". In the simplest case, this message consists of a single byte with the meaning "ready". This message is passed on by a ready work processor to its distributor, which then switches to the "passive" state.

For the further description, first of all a one-dimensional connection pattern such as, for example, in FIG. 1a or FIG. 2 is now assumed with $N-1$ as the last node. If this last node is ready, it sends the ready message to its "left" neighbour $N-2$. This distributor then waits for both its neighbour $N-1$ on the right and also its local work processor to be ready. Then and only then does it send the ready message to its neighbour $N-3$ on the left, where this process is repeated. After $N-1$ steps, the ready message arrives at the node 0, which finally notifies the host computer, provided that work processor 0 is also already ready.

If, for example, node 0 is connected to $N-1$ to form a closed ring, the forwarding of the ready message can also take place from "left to right" ($0, 1, \ldots N-1$), in which case node $N-1$ notifies its neighbour 0 again via the ring connection and it notifies the host computer.

Given an n-dimensional connection topology ($n>1$), the process can be accelerated by first of all collecting all ready messages of all one-dimensional subarrays of the $n^{th}$ dimension in all nodes of the form ($i_1, i_2 \ldots i_{n-1}$, 0), then all ready messages of the one-dimensional subarray of the form ($i_1, i_2, \ldots i_{n-2}$, *, 0) in the nodes of the form $i_1, i_2, \ldots i_{n-2}, 0, 0$, etc., until finally the ready message arrives at the node ($0, 0, \ldots 0$), which then notifies the host computer. In relation to the arrangement represented in FIG. 4, this means that, for example, the ready messages of the nodes K77, K76 . . . K71 are collected in the node K70 as with a one-dimensional arrangement, the ready messages of the nodes K67, K66 etc. are collected analogously in the node K60, to the nodes K07, K06 . . . K02, K01, whose ready messages are collected in the node K00. For their part, the nodes K70, K60 . . . K20 and K10 collect, as in the one-dimensional case, the ready messages until finally also the ready message arrives in the node K00 in this direction, and only now does the latter forward this ready message to the host computer H. It is also possible to collect the ready messages of the node computers first of all in columns in the topmost line and then in this topmost line to the node K00. It is also possible to collect the ready messages in the node computers K07, K17 . . . K67 and K77 of the right-hand column, and then the ready message of this column in the node K07, from where these are transferred via the ring connection to the node K00 and then to the host computer H. The collection of ready messages in succession via the individual dimensions is frequently faster than if each node waits for the ready messages of node computers in a specified neighbourhood, for example in the case of a two-dimensional arrangement for the right and the bottom neighbouring nodes, i.e. in relation to FIG. 4, if the node K66 waits for the ready messages of the nodes K76 and K67, etc.

In the case of trees, it is possible to start from all end nodes; these notify their fathers; one father waits until it itself and all its sons are ready, and then in turn notifies its father. After a finite number of steps, the ready message arrives at the root, which then notifies the host computer.

Once the node K00 has then transferred the ready message to the host computer H directly connected to it, all node computers are then in the "passive" state and await a new instruction from the host computer. No renewed loading of the entire network with programs is required here.

In addition, the following possibilities can also be provided. In the case of certain problem solutions, it may occur that the same data is to be transferred from one node computer at a particular time to all other node computers. This could be performed in the same way as the described transfer of the data packets i.e. the same data packet is repeatedly sent with a different address in each case in succession, but this requires a great deal of time. It is more favourable to use a different value, i.e. a different bit combination in the first byte of the data packet, which as was mentioned contains the type of information transferred, and instead of this no destination address, and all receiving distributors forward this data packet like an instruction to their own work processors and to all directly connected distributors. In this case, just as with the forwarding of the instructions, the possibility of duplicated reception of the data packet via different paths must be taken into account. It is possible in this way to transfer such data packets "to all" quickly.

Another possibility is to switch the network to a completely idle state, that is to say also terminate the waiting loop. This can be done by special instruction, which can also be flagged by another first byte, or by a special parameter value in the normal instruction. However, it should be taken into account that the final idle stage is only assumed once an associated ready message for the setting of this idle stage has been forwarded.

I claim:

1. In a multicomputer system comprising:
   A) a host computer,
   B) a parallel computer comprising a network of independent node computers connected to one another via first bidirectional connection lines,
   C) said host computer being connected directly to at least a first node computer but being unconnected directly to second node computers whereby communication between the host computer and the second node computers can only take place via other node computers,
   D) each said node computer comprising a distributor and a work processor, each said work processor functioning to execute a program or part program in response to an instruction generated by the host computer and only exchanging information with the distributor of its own node computer via second bidirectional connection lines internal to the node computer, E) each said distributor, except for the distributor in the first node computer, being connected to exchange information only with the work processor of its own node computer and with only those distributors of other node computers to which it is connected via the first bidirectional connection lines, the improved process comprising the steps of:

(a) in response to each instruction received from the host computer, each node computer executing a repeating cycle comprised of:

(i) a first instruction part wherein, if the received instruction is not the same as a previous instruction, each distributor forwards the instruction from the host computer to distributors directly connected to it and also to the work processor of its own node computer, and if the instruction is the same as a previous instruction, it does not forward the instruction to all distributors directly connected to it, (ii) a second execution part following the first instruction part during which the work processor of each node computer starts the execution of the program corresponding to the instruction received from its own distributor and at the same time its own distributor independently executes the forwarding of any data packet received from its own work processor or via external connection lines to a destination determined by the data packet, (iii) a third ready message part following completion of the second execution part during which each distributor outputs a ready message via a predetermined connection line when the work processor in the same node computer and the distributors of neighboring node computers have output a ready message to said each distributor such that the first node computer directly connected to the host computer outputs a ready message to the host computer only after its own work processor and the work processors of all the other node computers have output a ready message.

2. Multicomputer system according to claim 1, characterized in that, before the reception of an instruction, all distributors are in a passive state in which they are in a program loop solely for receiving an instruction.

3. Multicomputer system according to claim 1, characterized in that each distributor first of all sends a received instruction onward via the corresponding connection lines and only then passes it to the work processor of the same node computer.

4. Multicomputer system according to claim 1, characterized in that each data packet to be transferred during the execution of an instruction contains at the beginning a destination specification of where the data packet is to be transferred, and in that on the basis of this destination information each distributor determines in accordance with a local method the connection line via which the respective data packet is to be forwarded.

5. Multicomputer system according to claim 4, characterized in that the local method consists in accessing an individual connection list stored in each distributor, which list contains for each destination specification at least one connection specification of the connection line via which the respective data packet is to be forwarded.

6. Multicomputer system according to claim 5, characterized in that, which each forwarding of a data packet in accordance with the connection list, the distance to the destination indicated by the destination specification decreases.

7. Multicomputer system according to claim 6, characterized in that a plurality of connection specifications are stored in the connection list for at least some of the destination specifications, and the selection among the connection specifications for a destination specification is carried out in accordance with a predetermined scheme.

8. Multicomputer system according to one of claim 7, characterised in that, given multidimensional arrangement of the node computers with respect to the connection lines, the destination specification consists of in each case one part-destination specification for each dimension, and in that each connection list has in each case one section for each dimension which contains a connection specification for the respective dimension.

9. Multicomputer system according to claim 8, characterised in that the distributors forward a data packet in the same dimension for all distributors until it has reached the destination ordinate in this dimension, and then forward it accordingly in the further dimensions.

10. Multicomputer system according to claim 1, characterised in that each distributor forwards a ready message via a connection line to a node computer which is closer to first node computer connected to the host computer.

11. Multicomputer system according to claim 10, characterised in that, given multidimensional arrangement of the node computers with respect to the connection lines, each distributor forwards a ready message in the direction of a dimension that is the same for all distributors when the preceding distributor in this dimension and its own work processor have output a ready message, until this message reaches the first node computer in this dimension, and in that the distributors in these node computers perform the forwarding of the ready message in a corresponding manner in another dimension in each case.

* * * * *